United States Patent Office 2,961,438
Patented Nov. 22, 1960

2,961,438
ORTHO-HYDROXY-AZO-DYESTUFFS

Otto Fuchs, Frankfurt am Main, and Reinhold Deubel, Kelkheim (Taunus), Germany, assignors to Farbwerke Hoechst Aktiengesellschaft vormals Meister Lucius & Bruning, Frankfurt am Main, Germany, a corporation of Germany No Drawing. Filed Dec. 29, 1958, Ser. No. 783,151

Claims priority, application Germany Dec. 31, 1957

5 Claims. (Cl. 260—152)

The present invention relates to new valuable ortho-hydroxy-azo-dyestuffs and to a process for preparing the same; more particularly it relates to dyestuffs corresponding to the following general formula

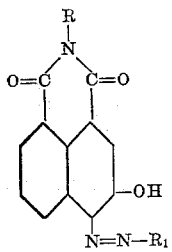

wherein R represents hydrogen, a substituted or unsubstituted, branched or straight-chained alkyl group, or a substituted or unsubstituted aryl group, and $R_1$ represents an aryl radical which may be substituted, for example, by halogen atoms, alkyl, aryl, aralkyl, cyanogen, trifluoromethyl, hydroxyl, alkoxy, aryloxy, carboxylic acid, nitro, arylamino, $SO_2$-alkyl, $SO_2$-aryl, CO-alkyl, CO-aryl or —N=N-aryl groups.

We have found that valuable ortho-hydroxy-azo-dyestuffs are obtained by coupling the condensation product of 3-hydroxynaphthalic acid or its anhydride and ammonia, an aliphatic or an aromatic amine with a diazonium compound of an aromatic amine.

The dyestuffs of this invention are suitably prepared by reacting 3-hydroxynaphthalic acid or its anhydride in known manner with ammonia, aliphatic or aromatic amines in an organic solvent or in water under pressure, coupling the imides so obtained in a weakly alkaline solution with diazonium compounds of aromatic amines and acidifying the reaction solution.

The same dyestuffs can also be obtained by coupling the diazonium compounds of aromatic amines with 3-hydroxynaphthalic acid and then condensing the ortho-hydroxy-azo-compounds so obtained, which contain two free carboxylic acid groups in peri-position, with ammonia, aliphatic or aromatic amines in an organic solvent or in water under pressure.

The new dyestuffs which are preferably brought into a fine subdivision are very suitable as disperse dyes for dyeing and printing synthetic fibers or foils on the basis of cellulose acetate, cellulose triacetate, polyurethane, polyacrylonitrile, polyvinyl chloride and also of polyesters, particuarly polyethylene-glycol terephthalate. Especially the dyeings produced on polyesters are distinguished by very good fastness to wet processing, ironing, thermofixation and light.

The following examples serve to illustrate the invention but they are not intended to limit it thereto; the parts being by weight unless otherwise stated and the relationship of parts by weight to parts by volume being the same as that of the kilogram to the liter.

Example 1

9.3 parts of aniline are diazotized in the usual manner and the diazo solution so obtained is slowly added to a solution of 21.3 parts of 3-hydroxynaphthalic acid imide and 4 parts of sodium hydroxide in 500 parts of water. By the addition of a sodium carbonate solution of 10% strength care is taken that the reaction liquid does not become acid but shows a pH-value of 8–9. When the coupling is complete, the precipitated dyestuff is filtered off with suction, triturated with a small amount of dilute hydrochloric acid and washed with water until neutral. When recrystallized from nitrobenzene, the dyestuff forms brown lustrous crystals and dyes material of polyester fibers from an aqueous suspension orange tints. The dyestuff dissolves in concentrated sulfuric acid to give a red solution. It corresponds to the following formula

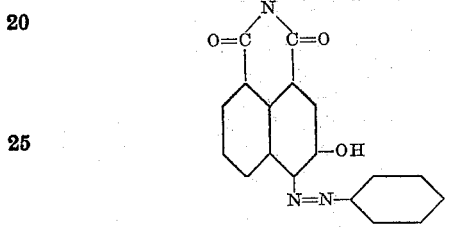

The 3-hydroxynaphthalic acid imide is obtained by reacting 3-hydroxynaphthalic acid anhydride with concentrated ammonia.

Example 2

28.5 parts of 3-hydroxynaphthalic acid-3'-methoxypropylimide, obtainable by condensing 3-hydroxynaphthalic acid anhydride with 3-methoxypropylamine, are dissolved in a solution of 8 parts of sodium hydroxide in 500 parts of water. To this solution is added dropwise a diazonium salt solution prepared from 13.9 parts of 1-amino-3-nitrobenzene, and simultaneously a sodium carbonate solution of 10% strength so that the reaction of the liquid is always weakly alkaline. The precipitated orange dyestuff is filtered off with suction and pasted with a small amount of dilute hydrochloric acid, filtered off again and washed with water until neutral. The dyestuff powder so obtained, which dissolves in concentrated sulfuric acid to give a claret solution, dyes fibrous material of triacetate, acetate silk or polyvinyl chloride golden orange tints from an aqueous suspension. The dyestuff is also very suitable for dyeing fibers or foils of polyethylene-glycol terephthalate. The dyeings so obtained are distinguished by good properties of fastness.

For the preparation of 3-hydroxynaphthalic acid-3'-methoxypropylimide 21.4 parts of 3-hydroxynaphthalic acid anhydride and 10 parts of 3-methoxypropylamine are heated for several hours at 120° C. in 300 parts of water to which a small amount of dilute sulfuric acid has been added. The separated nearly colorless product is filtered off with suction and washed with water until neutral. It is sufficiently pure for further processing. When recrystallized from methanol, the product melts at 183° C.

Example 3

A diazonium salt solution obtained by diazotizing in the usual manner 17.3 parts of 1-amino-2-nitro-4-chlorobenzene and a sodium carbonate solution of 10% strength are slowly introduced, while cooling and stirring well, into a solution of 26.9 parts of 3-hydroxynaphthalic acid-n-butylimide and 8 parts of sodium hydroxide dissolved in 500 parts of water. The precipitated red dyestuff is filtered off with suction, pasted with a small amount of dilute hydrochloric acid, washed with water and dried. The powder so obtained is recrystallized from glacial acetic acid and obtained in the form of fine felted crystals. It dyes polyester fiber material from an aqueous dispersion bright red tints of very good fastness to washing, thermofixation, ironing, solvents and light.

The 3-hydroxynaphthalic acid-n-butylimide used as coupling components can be prepared in the following manner: 21.4 parts of 3-hydroxynaphthalic acid anhydride are dissolved in 100 parts of pyridine, mixed with 14 parts of n-butylamine and boiled for some time under reflux. After cooling, the reaction product is diluted with water and the solution is then run into hydrochloric acid. The separated slightly yellowish colored 3-hydroxynaphthalic acid-n-butylimide melts, when recrystallized from dilute methanol, at 188–189° C.

*Example 4*

When in Example 3 the 3-hydroxynaphthalic acid-n-butylimide is replaced by 28.5 parts of 3-hydroxynaphthalic acid-3'-methoxypropylimide and the procedure is otherwise the same as indicated in that example, a dyestuff is obtained which dyes polyester fibers likewise red tints. The dyestuff has also affinity for polyurethane fibers.

The same dyestuff can also be obtained in the following manner: A diazonium salt solution is prepared from 17.3 parts of 1-amino-2-nitro-4-chlorobenzene and slowly run dropwise into a solution of 21.4 parts of 3-hydroxynaphthalic acid anhydride, 30 parts by volume of a sodium hydroxide solution of 30% strength and 120 parts of crystallized sodium acetate in 400 parts of water. A further amount of sodium acetate is added in order to ensure that the coupling takes place at a pH-value of 5–6. The red-brown precipitate formed is filtered off with suction, washed with water until neutral and dried. 4 parts of this intermediate product and 1.4 parts of 3-methoxypropylamine are dissolved in 150 parts of water and, after the addition of a small amount of dilute hydrochloric acid, the mixture is heated for some time at the boil. A red dyestuff precipitates which is identical with the above product.

*Example 5*

12.7 parts of 1-amino-2-chlorobenzene are diazotized in the usual manner. The diazo solution so obtained is slowly run into a solution of 28.5 parts of 3-hydroxynaphthalic acid-3'-methoxypropylimide and 4 parts of sodium hydroxide in 600 parts of water. A sodium carbonate solution of 10% strength is added simultaneously in order to avoid that the reaction liquid becomes acid. After acidifying the precipitated orange red dyestuff is filtered off with suction, washed with water and dried. It dyes fibrous material on the basis of polyethyleneglycol terephthalate or polyacrylonitrile from an aqueous dispersion clear orange tints.

*Example 6*

A diazonium salt solution from 14.3 parts of 1-aminonaphthalene is introduced dropwise into a solution of 28.5 parts of 3-hydroxynaphthalic acid-3'-methoxypropylimide and 4 parts of sodium hydroxide in 600 parts of water, while adding simultaneously a sodium carbonate solution of 10% strength. The brown dyestuff which precipitates at the beginning of the coupling possesses a good affinity for fabrics for polyethylene-glycol terephthalate and dyes this material from an aqueous suspension beautiful red-brown tints of very good properties of fastness.

*Example 7*

When the 3-hydroxynaphthalic acid-n-butylimide in Example 3 is replaced by 25.6 parts of 3-hydroxynaphthalic acid-β-hydroxyethylimide obtainable by condensing 3-hydroxynaphthalic acid anhydride with ethanolamine, and the procedure is the same as indicated in that example, a dyestuff is obtained which dyes polyester fiber material from an aqueous suspension red tints. The dyestuff dissolves in concentrated sulfuric acid to give a red-violet solution. When recrystallized from nitrobenzene, it is obtained in the form of felted brown crystals.

*Example 8*

9.3 parts of aniline are diazotized and the diazonium salt solution so obtained is introduced into a solution of 32.4 parts of 3-hydroxynaphthalic acid-4'-chlorophenylimide and 4 parts of sodium hydroxide in 300 parts by volume of ethanol and 600 parts of water. In order to neutralize the acid of the diazonium salt solution, a sodium carbonate solution of 10% strength is simultaneously added thereto. The dyestuff which is rapidly formed is filtered off with suction, pasted with dilute hydrochloric acid and washed with water until neutral. It dissolves in concentrated sulfuric acid to give a red solution. After recrystallization it is obtained in the form of brown felted small needles. The dyestuff dyes polyethylene-glycol terephthalate fibers yellow-orange tints of good properties of fastness.

For the preparation of the 3-hydroxynaphthalic acid-4'-chlorophenylimide used as coupling component 21.4 parts of 3-hydroxynaphthalic acid anhydride and 24 parts of 1-amino-4-chlorobenzene in 250 parts by volume of glacial acetic acid are boiled for some hours under reflux, the nearly colorless imide so obtained is filtered off with suction and washed with methanol. It melts at a temperature above 320° C.

The following table indicates a number of further components which can be used in this invention and also the tints of the azo-dyestuffs prepared from these components on polyethylene-glycol terephthalate fibers, which likewise possess good properties of fastness.

| Diazo Component | Coupling Component | Tint |
| --- | --- | --- |
| Aniline | 3-hydroxynaphthalic acid-3'-methoxypropylimide. | orange. |
| 1-amino-2-methylbenzene | ----do---- | Do. |
| 1-amino-3-methylbenzene | ----do---- | Do. |
| 4-aminodiphenyl | ----do---- | brown. |
| 1-amino-4-chlorobenzene | ----do---- | orange. |
| 1-amino-2-bromobenzene | ----do---- | orange-red. |
| 1-amino-2-hydroxy-5-chlorobenzene. | ----do---- | brown. |
| 1-amino-4-methoxybenzene | ----do---- | yellow-brown. |
| 4-aminodiphenylether | ----do---- | Do. |
| 1-amino-2-nitrobenzene | ----do---- | orange. |
| 1-aminobenzene-2-carboxylic acid. | ----do---- | pink. |
| 1-amino-4-acetylaminobenzene | ----do---- | yellow-brown. |
| 1-aminobenzene-4-carboxylic acid amide. | ----do---- | orange. |
| 1-amino-2,4-dinitrobenzene | ----do---- | red. |
| 1-amino-2-chloro-4-nitrobenzene. | ----do---- | Do. |
| 1-amino-2-nitro-4-methoxybenzene. | ----do---- | red-brown. |
| 1-amino-2-nitro-4-benzonitrile. | ----do---- | red. |
| 1-amino-2-methoxybenzene-5-sulfonic acid diethylamide. | ----do---- | Do. |
| 1-amino-2-trifluoromethyl-4-chlorobenzene. | ----do---- | orange. |
| 1-amino-3,5-bis-trifluoromethylbenzene. | ----do---- | Do. |
| 1-amino-2,4-dimethyl-3-nitrobenzene. | ----do---- | Do. |
| 4-aminodiphenylamine | ----do---- | red-violet. |
| 4-amino-1,1'-azobenzene | ----do---- | brown. |
| 4-amino-2,5-dimethoxy-4'-nitro-1,1'-azobenzene. | ----do---- | grey. |
| 1-amino-2-nitronaphthalene | ----do---- | currant. |
| 1-aminoanthraquinone | ----do---- | red. |
| 1-amino-3-nitrobenzene | 3-hydroxynaphthalic acid-methylimide. | orange. |
| 1-amino-2-nitro-4-chlorobenzene. | ----do---- | red. |
| 1-amino-3-nitrobenzene | 3-hydroxynaphthalic acid-n-butylimide. | orange. |
| 1-amino-4-acetylaminobenzene | 3-hydroxynaphthalic acid-iso-butylimide. | red-brown. |
| 1-aminonaphthalene | 3-hydroxynaphthalic acid-n-hexylimide. | Do. |
| 4-amino-1,1'-azobenzene | 3-hydroxynaphthalic acid-Ω-hydroxypropylimide. | brown. |
| 1-aminonaphthalene | 3-hydroxynaphthalic acid-3'-ethoxypropylimide. | Do. |
| 1-amino-4-acetylaminobenzene | 3-hydroxynaphthalic acid-cyclohexylimide. | Do. |
| 1-amino-2,4-dinitrobenzene | ----do---- | pink. |
| 1-amino-2-nitro-4-chlorobenzene. | 3-hydroxynaphthalic acid-phenylimide. | red. |

| Diazo Component | Coupling Component | Tint |
|---|---|---|
| 1-amino-2-nitro-4-chlorobenzene. | 3-hydroxynaphthalic acid-2'-methoxyethylimide. | red. |
| 1-amino-3-nitro-4-chlorobenzene. | 3-hydroxynaphthalic acid-3'-methoxypropylimide. | orange. |
| 1-amino-2-nitro-4-cyanobenzene. | 3-hydroxynaphthalic acid-n-butylimide. | red. |

We claim:
1. Ortho-hydroxy-azo-dyestuffs corresponding to the following general formula

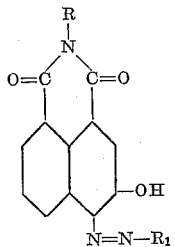

wherein R represents a member selected from the group consisting of hydrogen, a straight-chained lower alkyl group, a branched lower alkyl group, cyclohexyl and a radical of the benzene series, and $R_1$ represents a member selected from the group consisting of radicals of the benzene, naphthalene, diphenyl and anthraquinone series.

2. The ortho-hydroxy-azo-dyestuff corresponding to the following formula

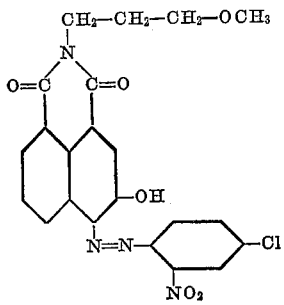

3. The ortho-hydroxy-azo-dyestuff corresponding to the following formula

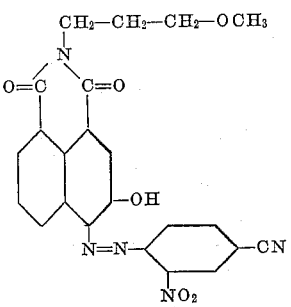

4. The ortho-hydroxy-azo-dyestuff corresponding to the following formula

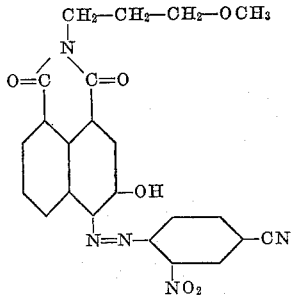

5. The ortho-hydroxy-azo-dyestuff corresponding to the following formula

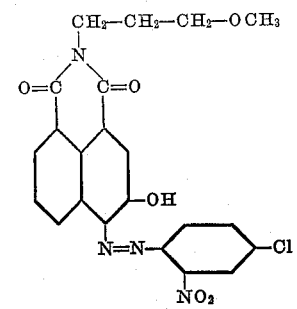

References Cited in the file of this patent
UNITED STATES PATENTS
1,758,313   Eckert et al. _____ May 13, 1930
FOREIGN PATENTS
46,622   France _____ Apr. 28, 1936